United States Patent
Renner (10) Patent No.: US 10,601,353 B2
(45) Date of Patent: Mar. 24, 2020

(54) SYSTEMS AND METHODS TO CONTROL AUXILIARY POWER OUTPUT VOLTAGE USING A WELDING OUTPUT VOLTAGE

(71) Applicant: Illinois Tool Works Inc., Glenview, IL (US)

(72) Inventor: Ross Neal Renner, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 383 days.

(21) Appl. No.: 15/431,966

(22) Filed: Feb. 14, 2017

(65) Prior Publication Data
US 2017/0317628 A1    Nov. 2, 2017

Related U.S. Application Data

(60) Provisional application No. 62/329,300, filed on Apr. 29, 2016.

(51) Int. Cl.
| | |
|---|---|
| *B23K 9/10* | (2006.01) |
| *H02P 9/14* | (2006.01) |
| *G05F 1/02* | (2006.01) |
| *H02P 9/00* | (2006.01) |
| *H02P 9/04* | (2006.01) |

(52) U.S. Cl.
CPC .............. *H02P 9/14* (2013.01); *B23K 9/1006* (2013.01); *G05F 1/02* (2013.01); *H02P 9/006* (2013.01); *H02P 9/04* (2013.01)

(58) Field of Classification Search
CPC .... B23K 9/1006; B23K 9/095; B23K 9/1056; B23K 9/10; H02P 9/04; H02P 9/006; H02P 9/14; G05F 1/02

USPC ................................ 219/133, 137 PS, 137 R
See application file for complete search history.

(56) References Cited

U.S. PATENT DOCUMENTS

| | | | |
|---|---|---|---|
| 6,111,217 A | 8/2000 | Beeson et al. | |
| 6,153,855 A | 11/2000 | Renner et al. | |
| 6,707,001 B1 * | 3/2004 | Ulrich | B23K 9/10 219/121.54 |
| 7,312,419 B2 | 12/2007 | Beeson | |
| 8,704,130 B2 | 4/2014 | Luo | |
| 2006/0157459 A1 * | 7/2006 | Fosbinder | B23K 9/1006 219/130.21 |
| 2007/0045259 A1 * | 3/2007 | Beeson | B23K 9/0956 219/133 |
| 2015/0073684 A1 | 3/2015 | Renner | |
| 2015/0239057 A1 | 8/2015 | Farah | |
| 2016/0098051 A1 | 4/2016 | Enyedy et al. | |

OTHER PUBLICATIONS

Int'l Search Report and Written Opinion for Appln No. PCT/US2017/029645 dated Aug. 9, 2017 (14 pages).

* cited by examiner

*Primary Examiner* — Brian W Jennison
(74) *Attorney, Agent, or Firm* — McAndrews, Held & Malloy, Ltd.

(57) ABSTRACT

Systems and methods to control auxiliary power output voltage using a welding output voltage are disclosed. An example power system includes an engine, a generator to provide electrical power based on mechanical power received from the engine, the electrical power comprising welding-type power and non-welding power, and a controller to control the generator or the engine to increase or decrease a voltage of the non-welding power based on a voltage measurement of the welding-type power.

20 Claims, 11 Drawing Sheets

| Input from polarity detectors | Overvoltage Detector 1 310a | | | | Overvoltage Detector 2 310b | | | | Circuit that controls output | Condition | Output |
|---|---|---|---|---|---|---|---|---|---|---|---|
| | 504 | | 508 | | 506 | | 510 | | 512 | 514 | 516 |
| | Battery voltage input < setpoint | Battery voltage input > setpoint | Circuit fault always "on" | Circuit fault always "off" | Battery voltage input < setpoint | Battery voltage input > setpoint | Circuit fault always "on" | Circuit fault always "off" | | | |
| ON | X | | | | X | | | | Both | Normal | ON |
| ON | X | | X | | X | | | | Circuit #1 | Fault | OFF |
| ON | X | | | X | X | | | | Circuit #2 | Fault | OFF |
| ON | X | | | | X | | | X | Circuit #2 | Fault | ON |
| ON | | X | X | | | X | | | Circuit #1 | Fault | ON |
| ON | | X | | | | X | | | Both | Normal | OFF |
| ON | | X | | X | | X | | | Circuit #1 | Fault | OFF |
| ON | | X | | | | X | X | | Circuit #2 | Fault | OFF |
| ON | | X | | | | X | | X | Circuit #1 | Fault | ON |

500
502

| STATE | Circuit #1 fault always on (608) | Circuit #1 fault always off | Voltage >112V peak (604) | Voltage <112V peak | Circuit #2 fault always on (610) | Circuit #2 fault always off | Voltage >112V peak (606) | Voltage <112V peak | Condition (612) | Circuit that controls output (614) | Output (616) |
|---|---|---|---|---|---|---|---|---|---|---|---|
| 1 |   |   |   | X |   |   |   | X | NORMAL | BOTH | ON |
| 2 | X |   |   | X |   |   |   | X | FAULT | CIRCUIT #1 | OFF |
| 3 |   |   | X |   |   |   |   | X | FAULT | CIRCUIT #2 | OFF |
| 4 |   | X |   | X |   |   |   | X | FAULT | CIRCUIT #2 | ON |
| 5 |   |   |   | X |   | X |   | X | FAULT | CIRCUIT #1 | ON |
| 6 |   |   | X |   |   |   | X |   | NORMAL | BOTH | OFF |
| 7 | X |   | X |   |   |   | X |   | FAULT | CIRCUIT #1 | OFF |
| 8 |   |   | X |   | X |   | X |   | FAULT | CIRCUIT #2 | OFF |
| 9 |   | X | X |   |   |   | X |   | FAULT | CIRCUIT #2 | OFF |
| 10 |   |   |   |   |   | X | X |   | FAULT | CIRCUIT #1 | OFF |

| LED | Function |
|---|---|
| LED 1a | Indicates compressor on and ready |
| LED 2a | Indicates over pressure condition when lit and not flashing |
| LED 3a | Indicates over temperature condition when lit and not flashing |
| Both LED 2a and 3a Flashing | Indicates problem with interconnect cable |

FIG. 9A

| LED | Function |
|---|---|
| LED 1b | Flashing indicates charge mode, solid indicates charge is complete |
| LED 2b | Indicates over voltage condition when lit and not flashing |
| LED 3b | Indicates reverse polarity condition when lit and not flashing |
| Both LED 2b and 3b Flashing | Indicates low battery voltage when in 24V charge mode and voltage is less than 18V |

SYSTEMS AND METHODS TO CONTROL AUXILIARY POWER OUTPUT VOLTAGE USING A WELDING OUTPUT VOLTAGE

RELATED APPLICATIONS

This patent claims priority to U.S. Provisional Patent Application Ser. No. 62/329,300, filed Apr. 29, 2016, entitled "Systems and Methods to Control Auxiliary Power Output Voltage Using a Welding Output Voltage." The entirety of U.S. Provisional Patent Application Ser. No. 62/329,300 is incorporated herein by reference.

BACKGROUND

Conventional engine-driven power systems provide welding output and an auxiliary (e.g., non-welding, general purpose) power output. For constant field, current controlled engine-driven generators, the auxiliary power output voltage of the generator decreases as the load on the generator is increased. Conventional power regulation methods attempt to maintain the auxiliary power voltage at a substantially constant voltage.

SUMMARY

Systems and methods to control auxiliary power output voltage using a welding output voltage are provided, substantially as illustrated by and described in connection with at least one of the figures, as set forth more completely in the claims.

DETAILED DESCRIPTION

Conventionally, auxiliary power regulation methods are based on using voltage feedback from the auxiliary power output. To accomplish voltage regulation using the auxiliary voltage feedback, a high voltage AC signal is provided to the control board. The high voltage AC signal is isolated from other components on the board that are operating at lower voltages, such as by maintaining a minimum distance between the high voltage signals and the lower voltage signals. Such techniques require additional board space and connections.

Disclosed examples allows the control of an engine driven generator auxiliary power output by regulating the auxiliary power output voltage based on voltage feedback from a welding output when there is no weld load applied.

Some disclosed examples control an open circuit peak voltage of the weld circuit to on single phase welders, so that the open circuit peak voltage cannot exceed a threshold voltage level (e.g., 113 V). In some such examples, the open circuit peak voltage control is limited using the weld voltage feedback, so that the open circuit peak voltage on the weld output remains below the threshold voltage level.

Welding-type power, as used herein, refers to power suitable for welding, plasma cutting, induction heating, air carbon-arc cutting and/or gouging (CAC-A), cladding, and/or hot wire welding/preheating (including laser welding and laser cladding).

Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Disclosed example power systems include an engine, a generator to provide electrical power based on mechanical power received from the engine, and a controller. In the examples, the electrical power includes welding-type power and non-welding power. In the examples, the controller controls the generator or the engine to increase or decrease a voltage of the non-welding power based on a voltage measurement of the welding-type power.

In some examples, the controller decreases the voltage of the non-welding power when the voltage measurement of the welding-type power exceeds a first threshold. Some such examples further include an overvoltage protection circuit to disable at least one of the welding-type power or the non-welding power when the voltage measurement exceeds a second threshold, where the second threshold is a higher voltage than the first threshold. In some such examples, the overvoltage protection circuit includes redundant circuits configured to selectively disconnect a welding-type output or a non-welding type output from the generator.

Some disclosed example power systems further include a voltage sensor to measure an open circuit voltage for a welding-type output and to provide the open circuit voltage to the controller as the voltage measurement of the welding-type power. In some examples, the controller controls the generator to increase the voltage of the non-welding power by increasing a field current of the generator. In some examples, the controller controls the generator to decrease the voltage of the non-welding power by decreasing a field current of the generator.

In some example power systems, the controller controls the generator or the engine to increase or decrease the voltage of the non-welding power when a welding-type output is not providing the welding-type power. Some example power systems further include an overvoltage protection circuit to disable at least one of the welding-type power or the non-welding power when the voltage measurement exceeds a threshold. In some examples, the welding-type power and the non-welding power are configured to receive power via a same field winding in the generator.

Disclosed example methods involve providing non-welding electrical output from an engine-powered electrical generator to an output device, measuring a voltage of a welding-type output provided by the electrical generator, and controlling the generator or the engine, using a control circuit, to increase or decrease a voltage of the non-welding output based on the voltage measurement of the welding-type output.

In some examples, controlling the generator or the engine involves decreasing the voltage of the non-welding output when the voltage measurement of the welding-type output exceeds a first threshold. Some such examples further involve disabling, using one or more circuits, at least one of the welding-type output or the non-welding output when the voltage measurement exceeds a second threshold, where the second threshold is a higher voltage than the first threshold. In some examples, disabling the at least one of the welding-type output or the non-welding output involves selectively disconnecting, via the one or more circuits, the welding-type output or the non-welding type output from the generator.

In some examples, measuring the voltage of the welding-type output involves measuring an open circuit voltage of the welding-type output and providing a signal representative of the open circuit voltage to a control circuit as the voltage measurement of the welding-type power. Some example methods further involve controlling the generator to increase the voltage of the non-welding output by increasing a field current of the generator. Some example methods further comprising involve controlling the generator to decrease the voltage of the non-welding output by decreasing a field current of the generator.

Some example methods further involve disabling at least one of the welding-type output or the non-welding output when the voltage measurement exceeds a threshold. In some examples, providing the non-welding output involves providing electrical power for the non-welding output from a same field winding in the generator as the welding-type output.

Disclosed example power systems include an engine, a generator, a battery charge circuit, and a controller. The generator provides electrical power based on mechanical power received from the engine, where the electrical power includes welding-type power and non-welding power. The battery charge circuit conditions the non-welding power. The controller controls the battery charge circuit. Without intervention from the user, the controller controls the battery charge circuit to operate in a crank assist mode in response to (i) detecting that a difference between a commanded battery charge voltage and a voltage output by the battery charge circuit is at least a threshold voltage difference and (ii) detecting that a field current in the generator is at least an upper threshold field current. Without intervention from the user, the controller controls the battery charge circuit to operate in a boost mode in response to (i) detecting that the difference between the commanded battery charge voltage and the voltage output by the battery charge circuit is at least a threshold voltage difference and (ii) detecting that the field current in the generator is between the upper threshold field current and a lower threshold field current.

In some examples, the controller controls the battery charge circuit to increase an output current of the non-welding power during the crank assist mode. In some such examples, the controller is to, without intervention from the user, disables the battery charge circuit when the battery charge circuit is in the crank assist mode for at least a threshold time. In some example power systems, the controller controls the battery charge circuit to increase an output voltage of the non-welding power during the boost mode. In some examples, the controller, without intervention from the user, controls the battery charge circuit to operate in a trickle charge mode in response (i) to detecting that a difference between a commanded battery charge voltage and a voltage output by the battery charge circuit is less than the threshold voltage difference and (ii) detecting that the field current in the generator is less than the lower threshold field current. In some such examples, the controller, without user intervention, disables the battery charge circuit when the battery charge circuit is in the trickle mode for at least a threshold time.

In some examples, the controller, when a battery voltage of a battery connected to the battery charge circuit has at least a threshold voltage and a predetermined polarity, enables the battery charger circuit to charge the battery. In some example power systems, the controller, when a battery voltage of a battery connected to the battery charge circuit has less than a threshold voltage or does not have a predetermined polarity, disables the battery charger circuit. In some examples, the controller disables the battery charge circuit in response to determining that a field current in the generator satisfies a threshold current and that an output voltage is greater than a battery reference voltage of a battery connected to the battery charge circuit.

Disclosed example power systems include an engine, a generator, a battery charge circuit, and a controller. The generator provides electrical power based on mechanical power received from the engine, where the electrical power includes welding-type power and non-welding power. The battery charge circuit conditions the non-welding power. The controller to controls the battery charge circuit. Without intervention from the user, the controller controls the battery charge circuit to operate in a crank assist mode in response to (i) detecting that a difference between a commanded battery charge voltage and a voltage output by the battery charge circuit is at least a threshold voltage difference and (ii) detecting that a field current in the generator is at least an upper threshold field current. Without intervention from the user, the controller controls the battery charge circuit to operate in a trickle charge mode in response to (i) detecting that the difference between the commanded battery charge voltage and the voltage output by the battery charge circuit is less than the threshold voltage difference and (ii) detecting that the field current in the generator is less than the lower threshold field current.

Disclosed example power systems include an engine, a generator, a battery charge circuit, and a controller. The generator provides electrical power based on mechanical power received from the engine, where the electrical power includes welding-type power and non-welding power. The battery charge circuit conditions the non-welding power. The controller to controls the battery charge circuit. Without intervention from the user, the controller controls the battery charge circuit to operate in a trickle charge mode in response to (i) detecting that a difference between a commanded battery charge voltage and a voltage output by the battery charge circuit is less than a threshold voltage difference and (ii) detecting that a field current in the generator is less than a lower threshold field current. Without intervention from the user, the controller controls the battery charge circuit to operate in a boost mode in response to (i) detecting that the difference between the commanded battery charge voltage and the voltage output by the battery charge circuit is at least the threshold voltage difference and (ii) detecting that the field current in the generator is between an upper threshold field current and the lower threshold field current.

Disclosed example non-transitory machine readable storage media include or store machine readable instructions. The instructions, when executed, cause a processing circuit to initialize an engine-driven generator to provide electrical power based on mechanical power received from the engine, the electrical power comprising welding-type power and non-welding power. The instructions also cause the processing circuit to control a battery charge circuit to operate in a crank assist mode without intervention from a user and in response to (i) detecting that a difference between a commanded battery charge voltage and a voltage output by the battery charge circuit is at least a threshold voltage difference and (ii) detecting that a field current in a generator is at least an upper threshold field current. The instructions also cause the processing circuit to control the battery charge circuit to operate in a boost mode without intervention from the user and in response to (i) detecting that a difference between a commanded battery charge voltage and a voltage output by the battery charge circuit is at least a threshold voltage difference and (ii) detecting that the field current in the generator is between the upper threshold field current and a lower threshold field current. In some examples, the instructions cause the processing circuit to, without intervention from the user, control the battery charge circuit to operate in a trickle charge mode in response to (i) detecting that a difference between a commanded battery charge voltage and a voltage output by the battery charge circuit is less than the threshold voltage difference and (ii) detecting that the field current in the generator is less than the lower threshold field current.

Figure 1:
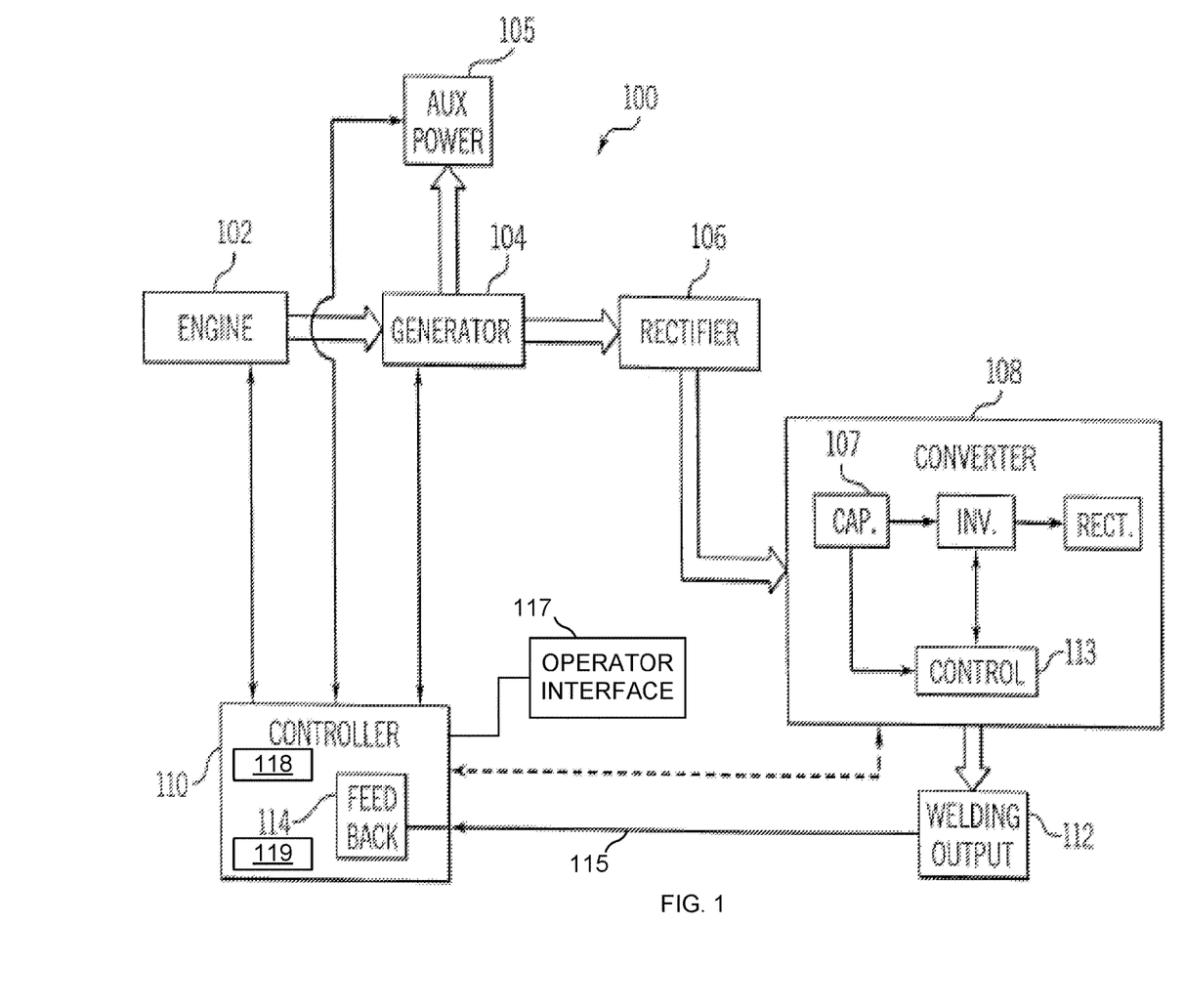
FIG. 1 is a diagrammatical overview of a work vehicle in which a service pack in accordance with aspects of this disclosure is installed.

A block diagram of an engine driven inverter based power system 100 is shown in FIG. 1, where the thick black lines indicate power transmission, and the thin lines indicate control or feedback signals. Power system 100 includes an engine 102, a generator 104, an aux power output 105, a rectifier 106, a converter 108, a controller 110, and a welding output 112. Generally speaking, engine 102 is a gas or diesel powered engine (a primary mover) that drives a shaft on which a rotor of generator 104 is mounted. Any engine suitable for the desired power output may be used, such as a diesel engine or gasoline engine.

Generator 104 may be a conventional generator having a rotor and stator, and, in the preferred embodiment, is designed by using a single phase generator. Additionally or alternatively, the generator 104 may have three phase windings. The rotor is magnetically coupled with the stator, and a field current is supplied such that when the rotor is turned, an AC output current is produced.

The electrical output of generator 104 is provided to power conditioning circuitry, including a rectifier 106 and a converter 108. The rectifier 106 produces rectified dc power. The rectified dc power is provided to converter 108, which includes, in the preferred embodiment, at least one energy storage device such as a capacitor 107 for smoothing the ripple in the rectified signal to provide a dc bus. In some other examples, a dc generator is used instead of ac generator 104 and rectifier 111, the rectifier 111 may be part of generator 104, and/or the rectifier 111 may be between the generator 104 and the converter 108.

The converter 108 also includes an inverter 109 and rectifier 111 that convert the smoothed and rectified dc signal to a welding output (having an appropriate current and voltage). Converter 108 is in the preferred embodiment, a series resonant converter that inverts the dc bus and an output rectifier to produce a dc welding current as the welding output 112. An ac output is used in an alternative embodiment. An example series resonant converter is described in detail in U.S. patent application Ser. No. 08/584,412, the entirety of which is incorporated herein by reference.

As described in application Ser. No. 08/584,412, a power control circuit 113 is included in converter 108 such that the welding current is selected by the operator, and the converter provides the desired current. Other control functions are also included, such as a hot start and a protection system.

The example converter 108 may support a wide range of welding processes. For example, the converter 108 may provide a pulse spray weld process may be performed, a short arc, spray CV, spray CC, CC stick, CC TIG, pulse MIG, and/or pulse TIG, among others. These process may be performed using the power system 100.

The converter 108 is a switched circuit that converts an ac or dc input to a different ac or dc output. An inverter, as used herein, is a switched circuit having a dc input and provides an ac output, or one that has an ac input and a rectifier to produce a dc signal that is then switched to produce an ac output that may. Also, as used herein, an inverter may include an output rectifier to produce a dc output.

The controller 110 is provided to control the engine 102 and/or the generator 104 in response to feedback 115 from the welding output 112. Feedback, as used herein, includes a signal indicative of or responsive to an output or intermediate signal, which is provided to the controller 110 and which control decisions are made in response thereto. Example feedback signals 115 include any welding operating parameter, such as current, voltage, frequency, power, ripple current, ripple magnitude, ripple voltage, ripple frequency, and/or functions and/or derivatives of these measures. The specific parameter feedback may be mathematically operated on as required by the control scheme.

Specifically, in some examples, the controller 110 includes a feedback circuit 114 that is connected to the welding studs to obtain a welding current and welding voltage feedback signal. The feedback circuit 114 may be included in and/or separate from the controller 110. The controller 110 may be on the same circuit board as the control circuit 113 or separate from the controller 110. In some examples, the controller 110 is part of the control circuit 113 to share feedback signals.

The controller 110 uses the feedback signal 115 to, among other things, determine the input power needed by converter 108, determine whether a welding peak voltage is approaching a fault condition, and/or to control an auxiliary output power from the auxiliary output 105. In response, the controller 110 controls a speed of engine 102 and/or a field current of the generator to provide that needed power. Generally, an engine speed control is controlling the speed of the engine, which controls the power output of the generator. The controller 110 causes engine 102 to operate at either an idle speed, or a run speed (close to or at full throttle). A solenoid may be used to move the run/idle lever to the desired position. Alternatively, more than two positions (run/idle) or a continuous range of positions may be selected, based on the power needed. In other examples, the controller 110 controls one or more of a throttle position, a fuel pump, an injection timer, a fuel to air ratio, fuel consumption and/or ignition timing.

The controller 110 includes a combination of one or more circuits, as well as firmware and software configured to monitor operation of the engine 102, the generator 104, and the power conditioning circuitry 106, 108, as well as certain loads in specific applications. Portions of the controller 110 may be centrally located as illustrated, or the circuitry may be divided to control the engine, generator and power conditioning circuitry separately. In most applications, however, such separated control circuits may communicate with one another in some form to coordinate control of these system components. The controller 110 is coupled to an operator interface 117. In most applications, the operator interface 117 will include a surface-mounted control panel that allows a system operator to control aspects of the operation and output, and to monitor or read parameters of the system operation. In a welding application, for example, the operator interface 117 may allow the operator to select various welding processes, current and voltage levels, as well as specific regimes for welding operations. These are communicated to the controller 110, which itself comprises one or more processors 118 and support memory 119. Based upon the operator selections, then, the controller 110 will implement particular control regimes stored in the memory via the processors. Such memory may also store temporary parameters during operation, such as for facilitating feedback control.

The auxiliary power 105 may include DC power and/or AC power for general purpose and/or specialized applications. In examples in which the power system 100 is configured on a work truck, the auxiliary power 105 may provide 12V and/or 24V DC power to, among other things, enable charging of automotive batteries or the like. Additionally or alternatively, the auxiliary power 105 may provide 110V and/or 230V AC power to enable the power system 100 to provide power to devices having standard outlet plugs. The operator interface 117 may control the controller 110 to configure the type(s) of power output by the auxiliary power 105. The controller 110 may then control the generator 104 and/or any power conditioning circuitry to provide the power selected via the operator interface.

In the example of FIG. 1, the auxiliary power 105 in the power system 100 is obtained from a same field winding in the generator 104 as the welding output. As a result of using a same field winding, the weld voltage droops when the auxiliary power 104 is loaded. Conventional techniques involved measuring the auxiliary output voltage to control the field current. However, high nominal auxiliary output voltages require voltage isolation measures to prevent disruption of low voltage circuitry by the high voltage measurement. The example controller 110 of FIG. 1 controls the weld voltage using a voltage-controlled (e.g., constant voltage) control method (e.g., instead of a current controlled or constant current control method). The controller 110 uses the open circuit weld voltage when the weld output is not being used to control the auxiliary power output. For example, if a droop in the weld open circuit voltage is identified, the controller 110 assumes a similar drop in the auxiliary output voltage and increase the field current to reduce or eliminate the droop at the auxiliary power. Thus, the controller 110 improves the auxiliary output voltage by reducing voltage drooping under load without requiring high voltage isolation techniques.

Figure 2:
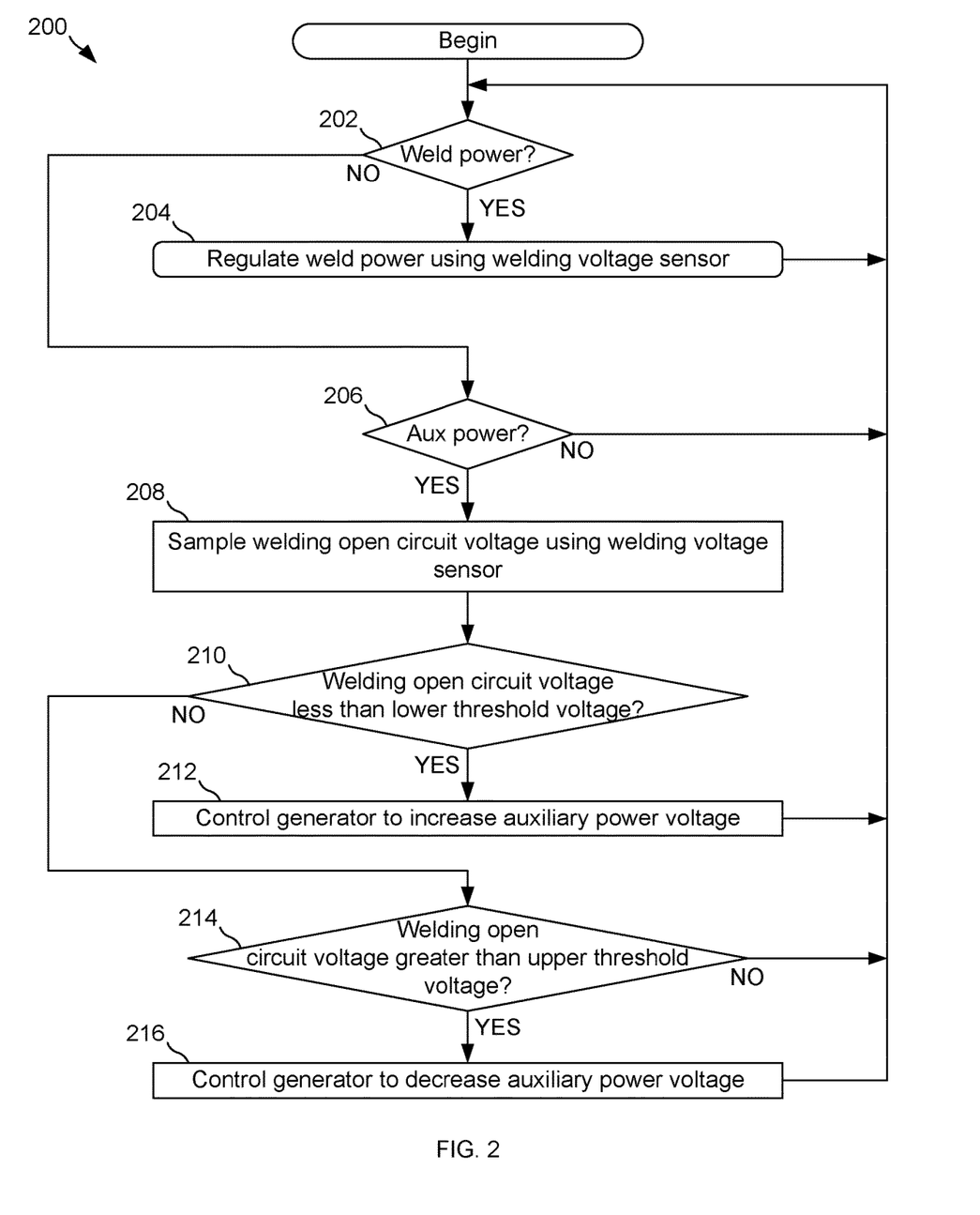
FIG. 2 is a flowchart illustrating example machine readable instructions which may be executed to implement the control circuitry of FIG. 1 to regulate an auxiliary power voltage of a service pack based on a weld power open circuit voltage of the service pack.

FIG. 2 is a flowchart illustrating example machine readable instructions 200 which may be executed to implement the control circuitry 70 of FIG. 1 to regulate an auxiliary power voltage of the power system 12 based on a weld power open circuit voltage of the power system 12.

At block 202, the control circuitry 70 determines whether the weld power is being used. For example, the control circuitry 22 may measure the weld output voltage and/or the weld current to determine whether the welding output is active. If weld power is being used (block 202), at block 204 the control circuitry 70 regulates the weld power using a welding voltage feedback (e.g., the feedback 114 of FIG. 1).

When the weld power is not being used (block 202), at block 206, the control circuitry 70 determines whether auxiliary power is being used. For example, the control circuitry 70 may measure the auxiliary current or another measure of whether the auxiliary power is under load. If auxiliary power is not being used (block 206), control returns to block 202.

If auxiliary power is being used (block 206), at block 208 the control circuitry 70 samples an open circuit voltage of the welding output (e.g., the feedback 114). For example, the control circuitry 70 may receive an output of a welding voltage sensor.

At block 210 the control circuitry 70 determines whether the welding open circuit voltage is less than a lower threshold voltage. The lower threshold voltage may be selected to correspond to a load at the auxiliary output that is causing a voltage droop. If the welding open circuit voltage is less than a lower threshold voltage (block 210), at block 212 the control circuitry 70 controls the generator 104 to increase the auxiliary power voltage (e.g., by increasing the field current). Control returns to block 202.

When the welding open circuit voltage is not less than the lower threshold (block 210), at block 214 the control circuitry 70 determines whether the welding open circuit voltage is greater than an upper threshold voltage. The upper threshold voltage may be selected to indicate that the welding voltage is approaching an unsafe voltage level (e.g., 113V) but leaving sufficient time to reduce the voltage by controlling the generator, rather than tripping a shutoff circuit. When the welding open circuit voltage is greater than an upper threshold voltage (block 214), at block 216 the control circuitry 70 controls the generator 104 to decrease the auxiliary power voltage (e.g., by decreasing the field current). If the welding open circuit voltage is not greater than an upper threshold voltage (block 214), or after decreasing the auxiliary power voltage (block 216), control returns to block 202.

Figure 3A:
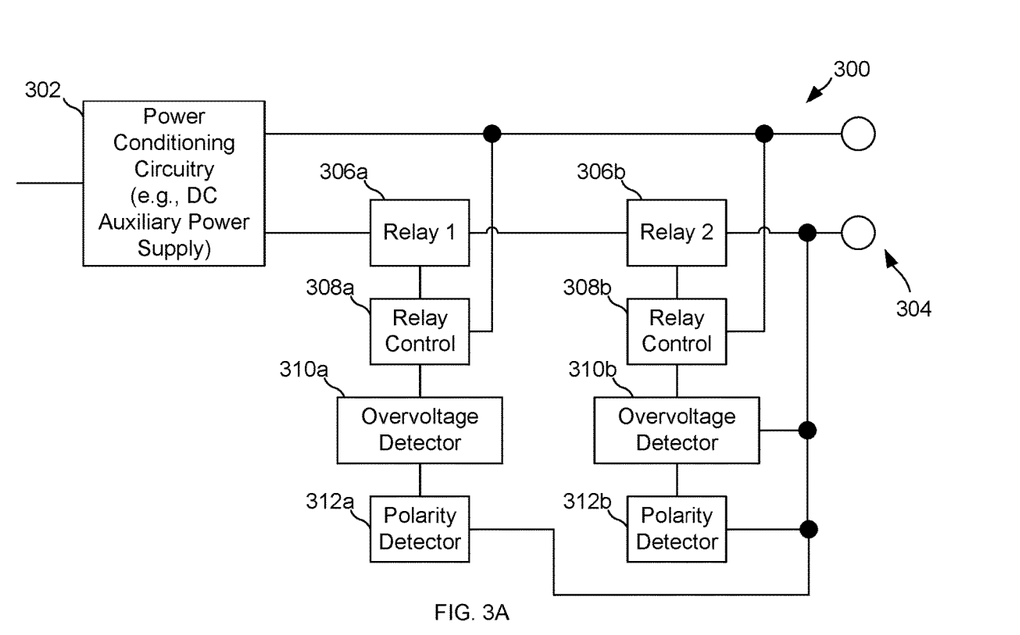
FIG. 3A is a block diagram of an example redundant protection circuit to provide overvoltage and/or reverse polarity detection to an auxiliary DC output port.

FIG. 3A is a block diagram of an example redundant protection circuit 300 to provide overvoltage and/or reverse polarity detection to an auxiliary DC output port. The redundant protection circuit 300 of FIG. 3A may be implemented in the auxiliary power circuit 105 of FIG. 1 that provides DC output power for general purpose use (e.g., 12V). The redundant protection circuit 300 is connected between power conditioning circuitry 302 that converts power from the generator 104 to the auxiliary power, and provides two circuits capable of cutting off power to auxiliary output terminals 304 in the event of a fault condition.

As illustrated in FIG. 3A, the redundant protection circuit 300 includes relays 306a, 306b, relay controls 308a, 308b, overvoltage detectors 310a, 310b, and polarity detectors 312a, 312b. The relays 306a, 306b are controlled by the relay controls 308a, 308b to open or close a circuit between the power conditioning circuitry 302 and the output terminals 304. When a fault, such as a reverse polarity fault or an overvoltage fault, is detected, one or both of the relays 306a, 306b are opened to cut off power to the output terminals 304. In some cases, the redundant protection circuit 300 may be restarted to reset a fault condition. If the fault occurs after a restart of the circuit 300, a more serious fault may be present that requires servicing of the power system 100.

The overvoltage detectors 310a, 310b measure the voltage across the terminals 304 and identify a fault if, for example, the voltage exceeds a threshold voltage. The polarity detectors 312a, 312b determine the polarity of a connection made between the terminals 304 and an output device, such as a battery to be charged. The polarity detectors 312a, 312b identify the polarity of the voltage at the terminals. If there is no polarity present (e.g., a non-voltage-generating device is connected), the polarity detectors 312a, 312b may not detect a polarity. The example polarity detectors 312a, 312b detect a fault when an incorrect polarity is present, but do not detect a fault if no polarity is detected.

Figure 4:
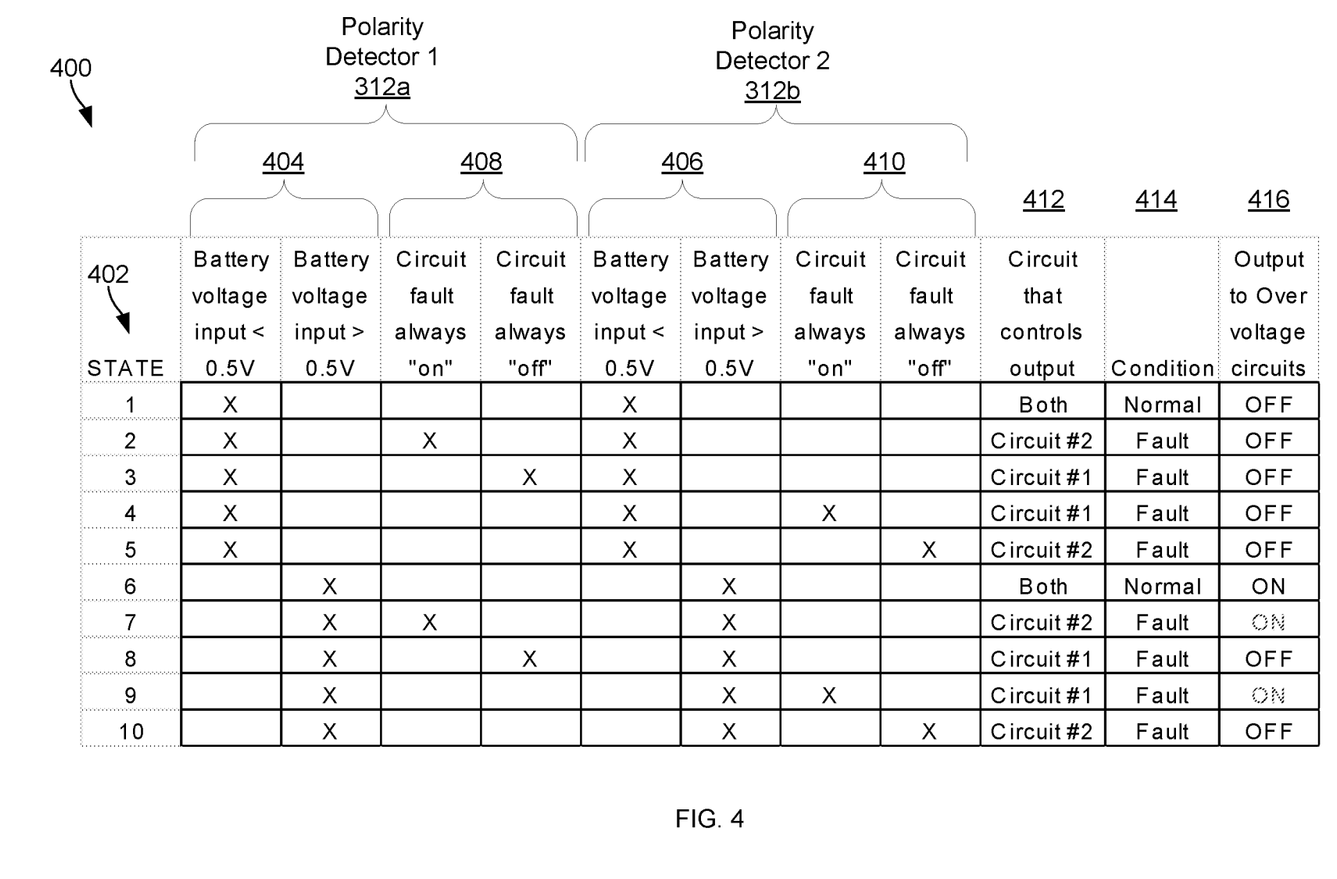
FIG. 4 is an example truth table for the polarity detector circuits of FIG. 3A.

FIG. 4 is an example truth table 400 for the polarity detectors 312a, 312b of FIG. 3A. The truth table 400 illustrates a number of states 402 of the polarity detectors 312a, 312b, each of which correspond to a polarity fault state (normal or fault) and output signals to the overvoltage detectors 310a, 310b. In the truth table 400, a detected voltage over a threshold of +0.5V ("Battery voltage input >0.5V") is a normal state, while a battery detected voltage less than the threshold of +0.5V ("Battery voltage input <0.5V"), whether a negative voltage or a low positive voltage, is a fault state. The table 400 includes battery voltage input conditions 404, 406 corresponding to the polarity detectors 312a, 312b, and circuit fault conditions 408, 410 corresponding to the polarity detectors 312a, 312b. The circuit fault conditions 408, 410 indicate whether a fault has occurred in the polarity detectors 312a, 312b that causes the output of the faulted polarity detectors 312a, 312b to be either always "on" or always "off."

Combinations of the conditions 404-410 cause one or both of the polarity detectors 312a, 312b to control the output to the overvoltage circuits (column 412), a condition of the polarity detectors 312a, 312b (e.g., column 414, either "normal" or "fault"), and the signal output to the overvoltage detectors 310a, 310b (e.g., column 416, either "on" to indicate that the polarity detectors 312a, 312b are permitting the auxiliary output to be enabled, or "off" to indicate that the auxiliary output is to be disabled via the relays 306a, 306b). The overvoltage detectors 310a, 310b of FIG. 3A are configured to disable the relays 306a, 306b via the relay controllers 308a, 308b when an "off" signal is received from the polarity detectors 312a, 312b.

Figure 5:
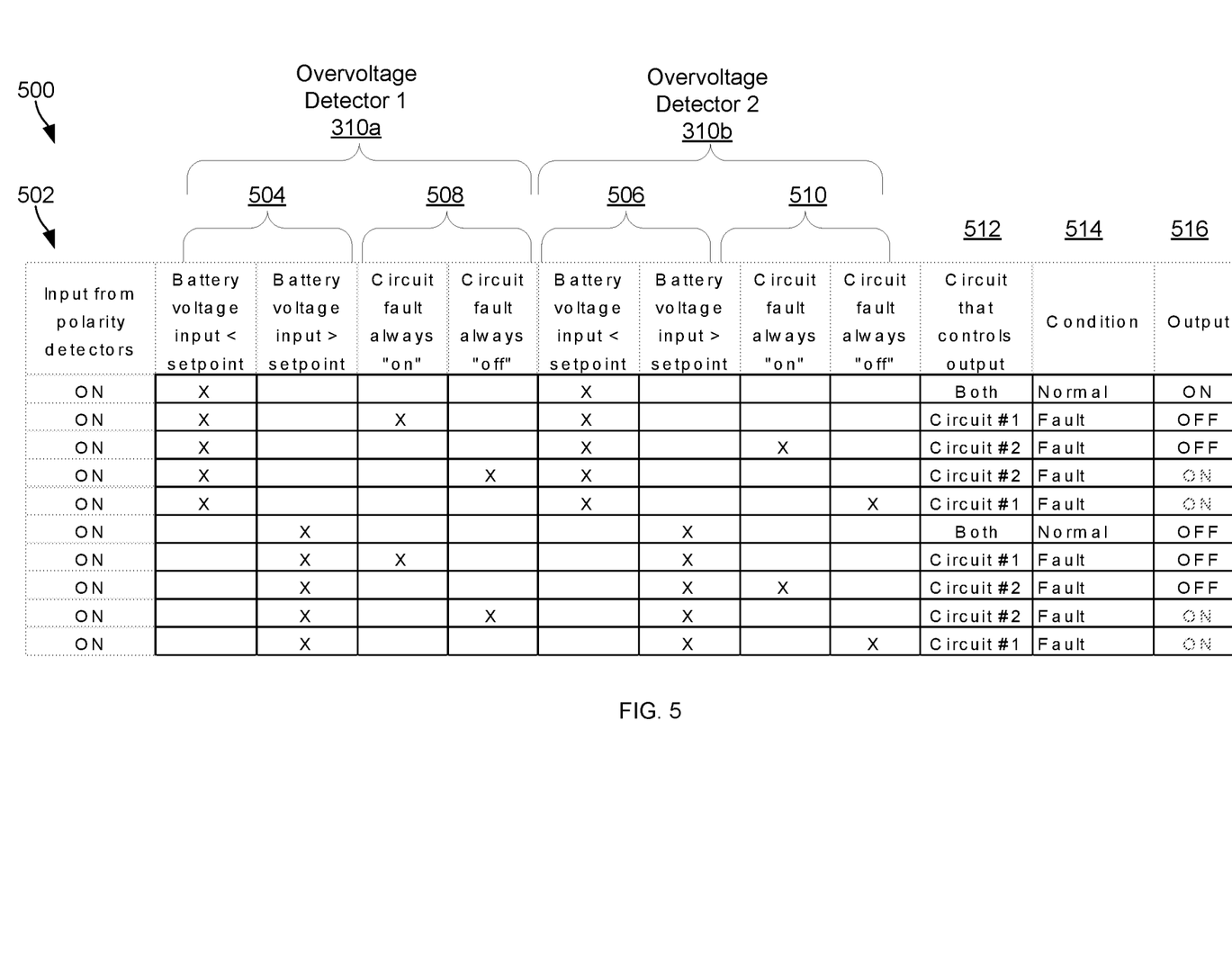
FIG. 5 is an example truth table for the overvoltage detector circuits of FIG. 3A.

FIG. 5 is an example truth table 500 for the overvoltage detectors 310a, 310b of FIG. 3A. The truth table 500 illustrates a number of states 502 of the overvoltage detectors 310a, 310b. Each of the states 502 correspond to an overvoltage fault state (normal or fault) and output signals to the relay controllers 308a, 308b. The states 502 of FIG. 5 require that the input from the polarity detectors 310a, 310b is "on." In the truth table 500, a detected voltage less than an overvoltage threshold is a normal state, and a detected voltage greater than the overvoltage threshold is a fault state. The table 500 includes battery voltage input conditions 504, 506 corresponding to the overvoltage detectors 310a, 310b, and circuit fault conditions 508, 510 corresponding to the overvoltage detectors 310a, 310b. The circuit fault conditions 508, 510 indicate whether a fault has occurred in the overvoltage detectors 310a, 310b that causes the output of the faulted overvoltage detectors 310a, 310b to be either always "on" or always "off."

Combinations of the conditions 504-510 cause one or both of the overvoltage detectors 310a, 310b to control the output to the relay controllers 308a, 308b (column 512), a condition of the overvoltage detectors 310a, 310b (e.g., column 514, either "normal" or "fault"), and the signal output to the relay controllers 308a, 308b (e.g., column 516, either "on" to indicate that the overvoltage detectors 310a, 310b are permitting the auxiliary output to be enabled, or "off" to indicate that the auxiliary output is to be disabled via the relays 306a, 306b).

Returning to FIG. 3B, this figure is a block diagram of an example redundant protection circuit 320 to provide overvoltage protection and detection to a welding output port. The example redundant protection circuit 320 is connected between weld power conditioning circuitry 322 and weld output terminals 324 of the power system 100 of FIG. 1. The redundant protection circuit 320 of FIG. 3B may be implemented in the auxiliary power circuit 105 of FIG. 1 that provides DC output power for general purpose use (e.g., 12V). The redundant protection circuit 300 is connected between power conditioning circuitry 302 that converts power from the generator 104 to the auxiliary power, and provides two circuits capable of cutting off power to auxiliary output terminals 304 in the event of a fault condition.

Figure 3B:
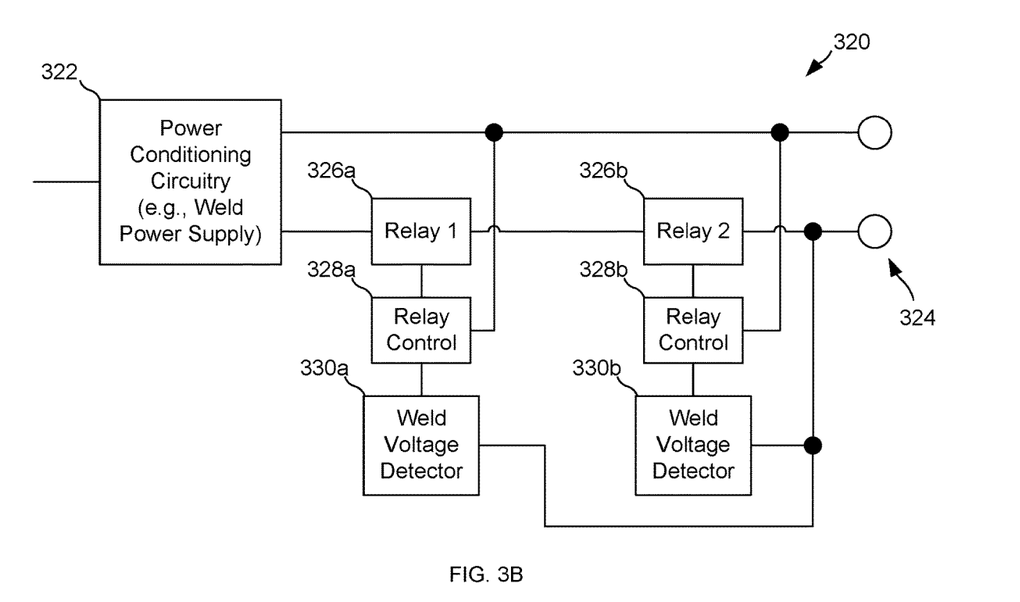
FIG. 3B is a block diagram of an example redundant protection circuit to provide overvoltage and detection to a welding output port.

The redundant protection circuit 320 includes relays 326a, 326b which are controlled by respective relay controls 328a, 328b. The relay controls 328a, 328b control the relays 326a, 326b based on inputs from weld voltage detectors 330a, 330b. The weld voltage detectors 330a, 330b measure the voltage across the weld output terminals 324 to determine whether a weld output overvoltage condition is occurring.

Figure 6:
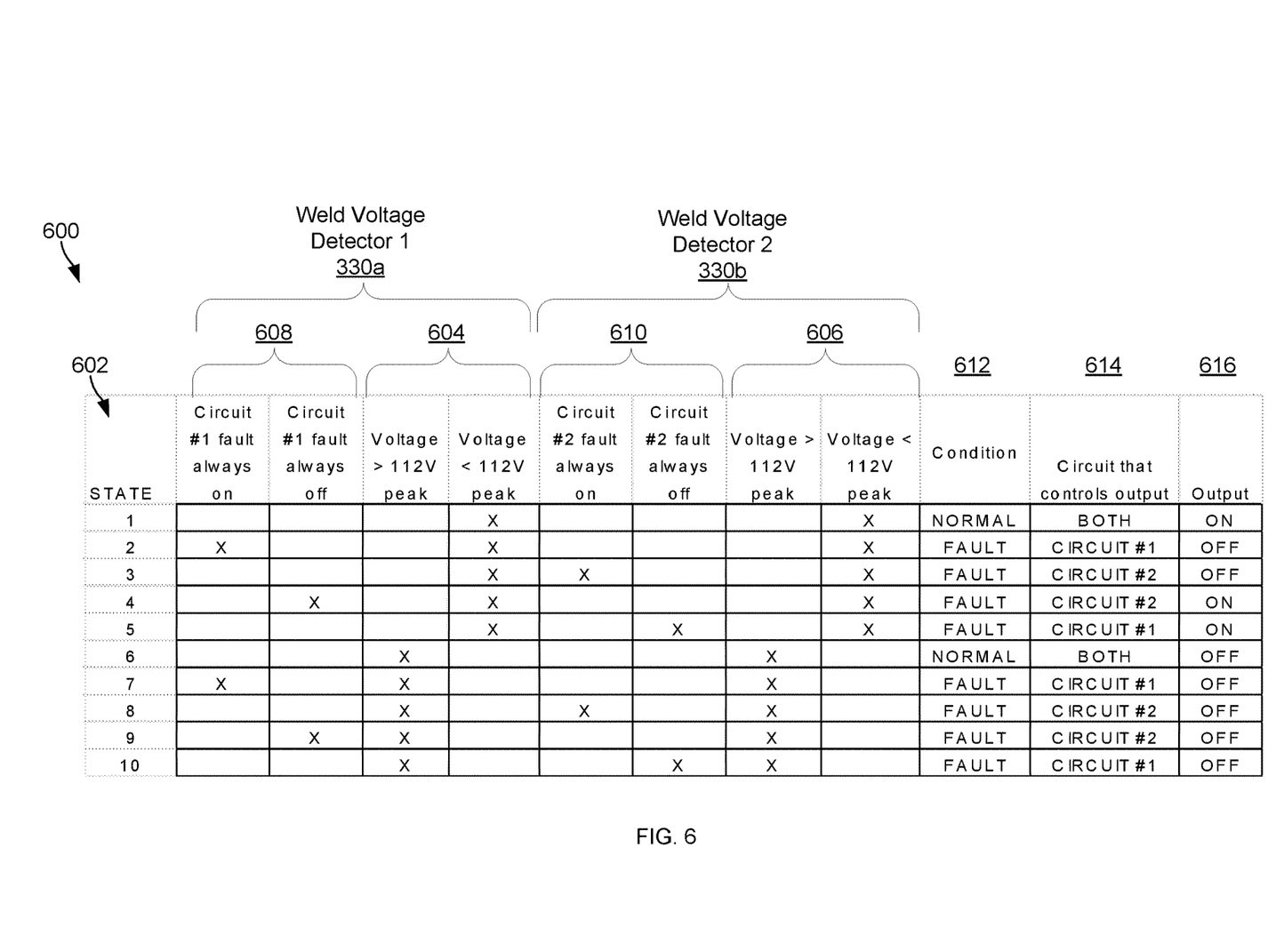
FIG. 6 is an example truth table for the weld voltage detector of FIG. 3B.

FIG. 6 is an example truth table 600 for the weld voltage detectors 330a, 330b of FIG. 3B. The truth table 600 illustrates a number of states 602 of the weld voltage detectors 330a, 330b. In the truth table 600, weld output peak voltages are fed back into the controller 114 and compared to a reference voltage by the controller 114. When the peak weld voltages go above a threshold (e.g., 110V), the controller 110 multiplies the difference between the actual output voltage and the reference voltage by a gain value, and subtracts the result from the command. The controller 110 thereby reduces the output of the generator 104 by lowering the field current in the rotor. The reduced output in the generator 104 keeps the weld output voltage peaks below 110V. The controller 110 reduce the likelihood of the weld voltages exceeding a 113V safe peak maximum, and reduces instances of the hardware redundant circuits from experiencing nuisance trips (e.g., tripping the system and cutting off power without a serious fault, posing a nuisance to the user without substantially improving safety). Without the controller 110 "folding back" on the output, peak weld voltages will occur outside of normal operating conditions, that will trip the redundant hardware circuits.

Each of the states 602 correspond to an overvoltage fault state (normal or fault) and output signals to the relay controllers 328a, 328b. In the truth table 600, a detected weld voltage less than an overvoltage threshold is a normal state, and a detected weld voltage greater than the overvoltage threshold is a fault state. The table 600 includes weld voltage input conditions 604, 606 corresponding to the weld voltage detectors 330a, 330b, and circuit fault conditions 608, 610 corresponding to the weld voltage detectors 330a, 330b. The circuit fault conditions 608, 610 indicate whether a fault has occurred in the weld voltage detectors 330a, 330b that causes the output of the faulted weld voltage detectors 330a, 330b to be either always "on" or always "off."

Combinations of the conditions 604-610 cause one or both of the weld voltage detectors 330a, 330b to control the output to the relay controllers 328a, 328b (column 612), a condition of the weld voltage detectors 330a, 330b (e.g., column 614, either "normal" or "fault"), and the signal output to the relay controllers 328a, 328b (e.g., column 616, either "on" to indicate that the overvoltage detectors 310a, 310b are permitting the auxiliary output to be enabled, or "off" to indicate that the auxiliary output is to be disabled via the relays 326a, 326b).

Figure 7A:
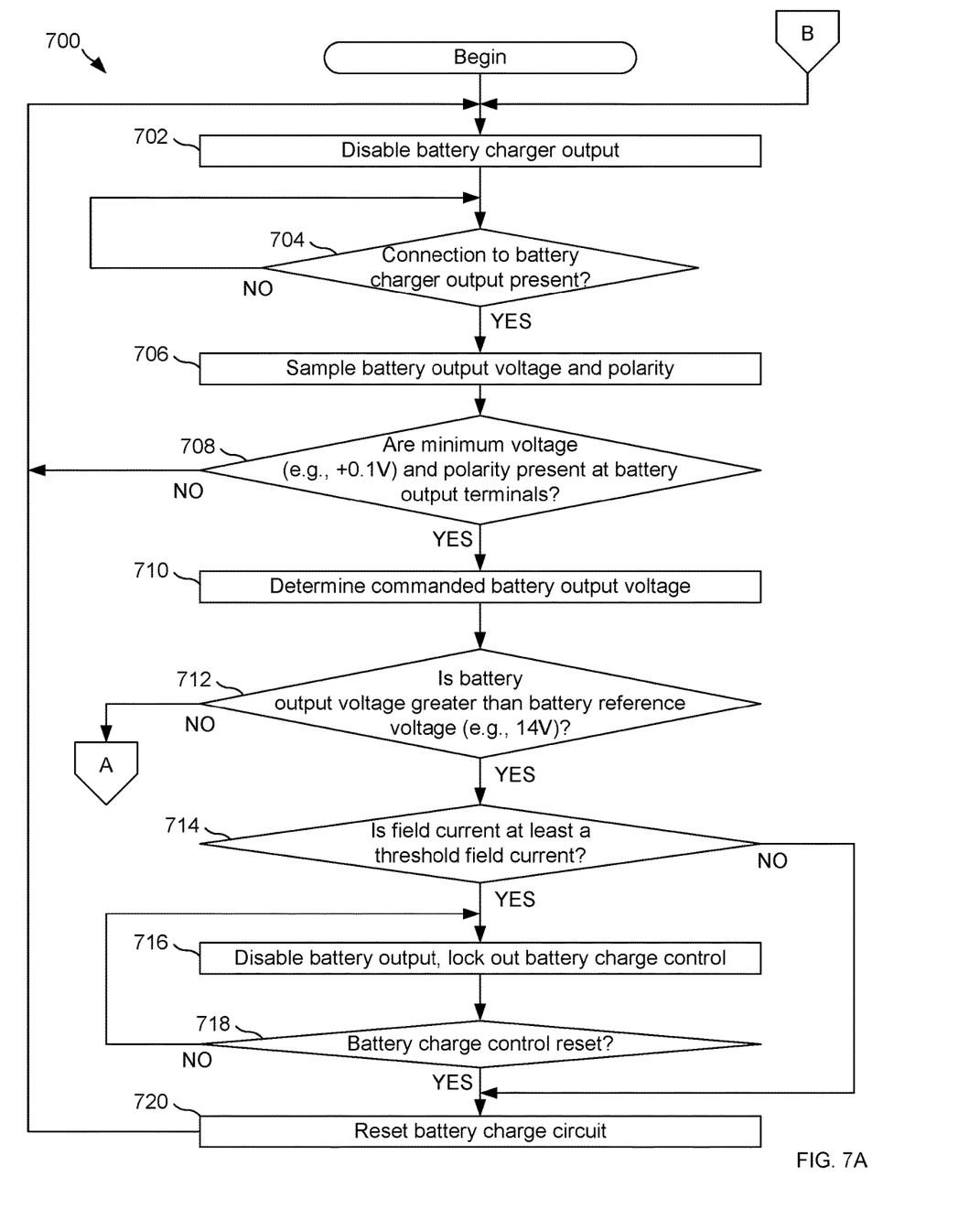
FIGS. 7A, 7B, and 7C show a flowchart representative of example machine readable instructions which may be executed to implement the control circuitry of FIG. 1 to automatically control a battery charger circuit.
Figure 7B:
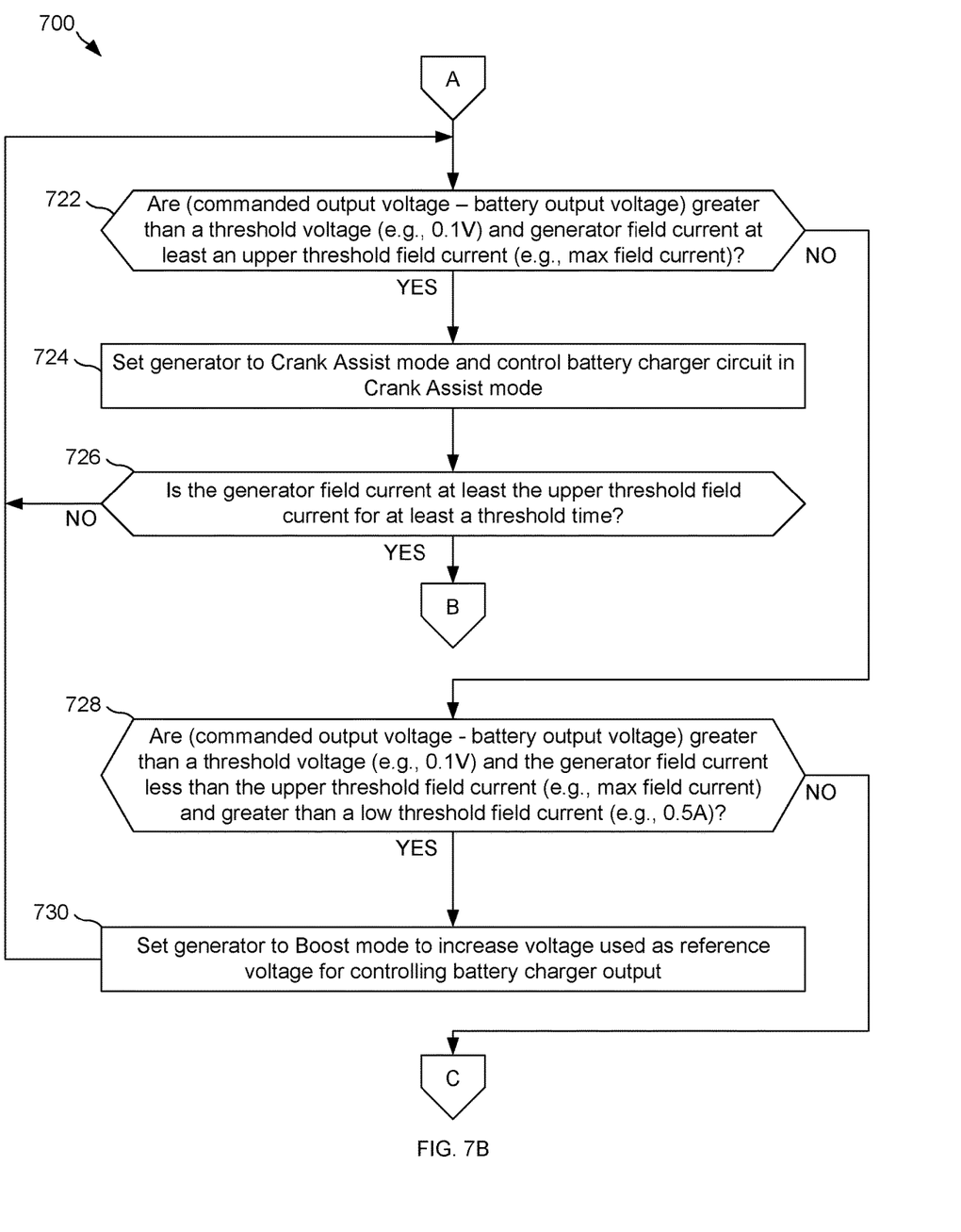
Figure 7C:
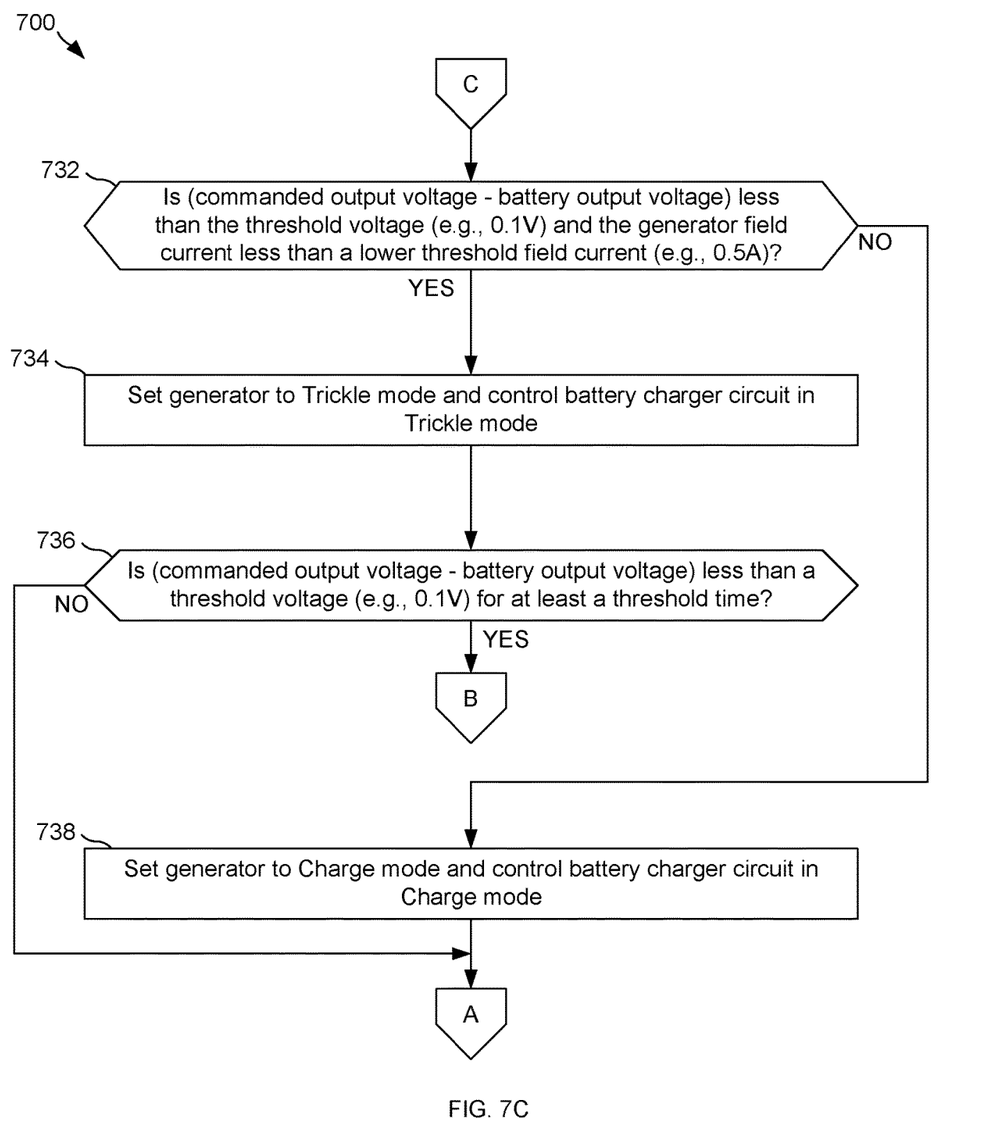

FIGS. 7A, 7B, and 7C show a flowchart representative of example machine readable instructions 700 which may be executed to implement the control circuitry 70 of FIG. 1 to automatically control a battery charger circuit, such as the auxiliary output 105 of FIG. 1.

At block 702, the controller 110 disables the battery charger output. Disabling the battery charger output may serve as a default state until the battery charger output is to be enabled. At block 704, the controller 110 determines whether a connection to a battery charger output is present. If a connection to the battery charger output is not present (block 704), control returns to block 704 to wait for a connection to a battery charger output.

When a connection to the battery charger output is present (block 704), at block 706 the controller 110 samples a battery output voltage and polarity. For example, the battery output voltage and polarity may be measured at the auxiliary output. At block 708, the controller 110 determines whether the minimum voltage (e.g., 0.1V) and correct polarity are present at the battery output terminals (e.g., based on the sampled battery output voltage and polarity). If the minimum voltage and/or the correct polarity are not present (block 708), control returns to block 702.

When the minimum voltage and correct polarity are present (block 708), at block 710 the controller 110 determines the commanded battery output voltage. For example, the controller 110 may determine that the commanded battery output voltage. At block 712, the controller 110 determines whether the battery output voltage is greater than a battery reference voltage. An example battery reference voltage is based on a target battery charging voltage (e.g., 14V). If the battery output voltage is greater than a battery reference voltage (block 712), at block 714 the controller 110 determines whether a field current in the generator 104 is at least a threshold field current. An example threshold field current is 0.5 A, which is a current below which a battery charger may be considered to be trickle charging.

If the field current is at least the threshold field current (e.g., 0.5 A) (block 714), at block 716 the controller 110 disables the battery output and locks out a battery charge control. For example, the controller 110 may disconnect the battery output to prevent overcharging or other hazardous conditions, as well as preventing user controls of the battery charging output (e.g., disabling user controls such as voltage controls, on/off switches, and/or other battery charging output controls). The controller 110 permits resetting of the battery charge control via a user control and/or via a reset of the entire power system 100.

At block 718, the controller 110 determines whether the battery charge control is reset. For example, the controller 110 may identify whether a user has triggered a battery charge control reset mechanism. If the battery charge control is not reset (block 718), control loops to block 716 to continue disabling the battery output. When the battery charge control is reset (block 718), or if the field current is not at least the threshold field current (block 714), at block 720 the controller 110 resets the battery charge circuit. After resetting the battery charge circuit 720 and/or if the minimum voltage and/or the correct polarity are not present at the battery output terminals, control returns to block 702.

Turning to FIG. 7B, if the battery output voltage is not greater than the battery reference voltage (block 712), at block 722 the controller 110 determines whether a difference between the commanded output voltage and the battery output voltage (e.g., commanded output voltage–battery output voltage) is greater than a threshold difference voltage and the generator field current is at least an upper threshold field current (e.g., a maximum field current). The threshold difference may be a small voltage, such as 0.1V, to enable the controller 110 to determine whether the battery is nearly fully charged for a battery conforming to expected battery characteristics.

If the difference between the commanded output voltage and the battery output voltage is greater than the threshold difference voltage and the generator field current is at least the upper threshold field current (block 722), at block 724 the controller 110 automatically sets the generator 104 to a "Crank Assist" mode and controls the battery charger circuit in the "Crank Assist" mode. The "Crank Assist" mode permits the battery charger to provide a substantial current to crank an engine or provide current for another large load. The change to the "Crank Assist" mode is automatic in that the controller 110 switches from a default mode, a charging mode, or another mode to the "Crank Assist" mode without user intervention. At block 726, the controller 110 determines whether the field current in the generator 104 is at least the upper threshold field current (e.g., at a maximum field current) for at least a threshold time (e.g., 20 seconds or some other time). If the field current in the generator 104 is not at least the upper threshold field current (e.g., at a maximum field current) and/or is at least the upper threshold field current for less than a threshold time (block 726), control returns to block 722. If the field current in the generator 104 is at least the upper threshold field current for at least the threshold time (block 726), control returns to block 702 of FIG. 7A. Additionally or alternatively, the controller 110 may receive input from a button or other user interface device that enables a user to set the controller 110 to the "Crank Assist" mode manually. The Crank Assist mode caused by the user input may be temporary, after which the controller 110 returns to a normal charge mode or to the last mode that the controller 110 was in prior to the user input.

The controller 110 determines whether the difference between the commanded output voltage and the battery output voltage is greater than the threshold difference voltage, and the generator field current is less than the upper threshold field current and greater than a lower threshold field current (block 728). If the difference between the commanded output voltage and the battery output voltage is greater than the threshold difference voltage, and the generator field current is less than the upper threshold field current and greater than a lower threshold field current (block 728), at block 730 the controller 110 automatically sets the generator 104 to a "Boost" mode to increase voltage used as a reference voltage for controlling the battery charger output. After the controller 110 sets the generator 104 to the Boost mode, control returns to block 722.

Turning to FIG. 7C, if the difference between the commanded output voltage and the battery output voltage is less than the threshold difference voltage and the generator field current is less than a lower threshold field current (block 732), at block 734 the controller 110 automatically sets the generator 110 to "Trickle" mode and controls the battery charger circuit in the "Trickle" mode. At block 736, the controller 110 determines whether the difference between the commanded output voltage and the battery output voltage is less than the threshold voltage for at least a threshold time. If the difference between the commanded output voltage and the battery output voltage is less than the threshold voltage for at least a threshold time (block 736), control returns to block 702.

If the difference between the commanded output voltage and the battery output voltage is at least the threshold difference voltage and the generator field current is less than the lower threshold field current (block 732), in block 738 the controller 110 sets the generator 104 to a "Charge" mode and controls the battery charger circuit in the "Charge" mode. Control then returns to block 722.

Figure 8:
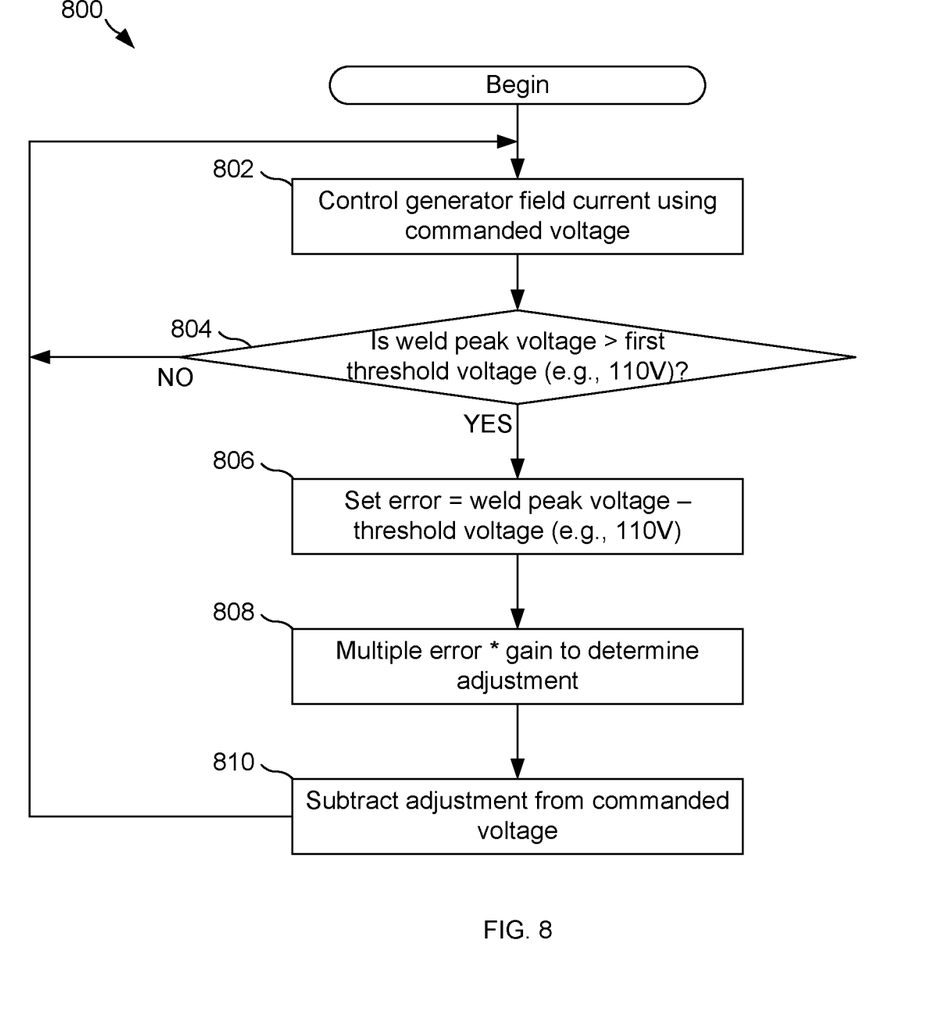
FIG. 8 is a flowchart illustrating example machine readable instructions which may be executed to implement the control circuitry of FIG. 1 to control a generator field current.

FIG. 8 is a flowchart illustrating example machine readable instructions 800 which may be executed to implement the controller 110 of FIG. 1 to control a generator field current. The instructions 800 may be executed to reduce or prevent overvoltage conditions from causing a fault. The field current may be for the weld voltage of the welding output. At block 802, the controller 110 controls the field current of the generator 104 using a commanded voltage. At block 804, the controller 110 determines whether the weld peak voltage is greater than a threshold voltage. For example, the threshold voltage may be 110V for a maximum permissible voltage of 113V. If the weld peak voltage is not greater than the threshold voltage (block 804), control returns to block 802.

If the weld peak voltage is greater than a threshold voltage (block 804), at block 806 the controller 110 sets the error as a difference between the weld peak voltage and the threshold voltage. At block 808, the controller 110 multiplies the calculated error by a gain factor to determine an adjustment. At block 810, the controller 110 subtracts the adjustment from the commanded voltage. Control returns to block 802.

Figure 9A:
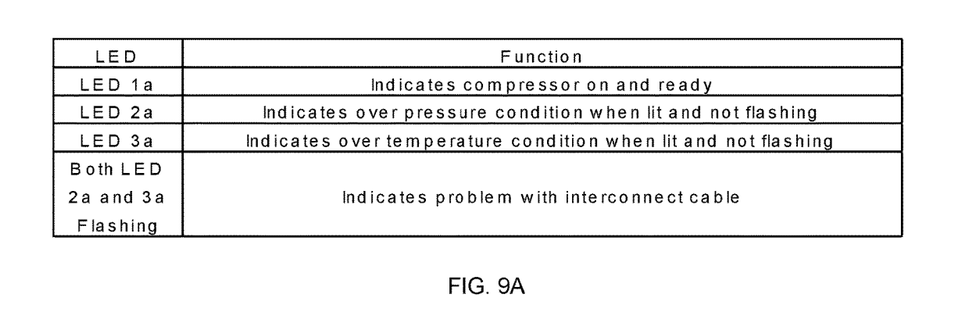
FIGS. 9A and 9B illustrate example functions of multiple-function LEDs that may be used on the service pack of FIG. 1 to provide information to an operator with a reduced number of LEDs.
Figure 9B:
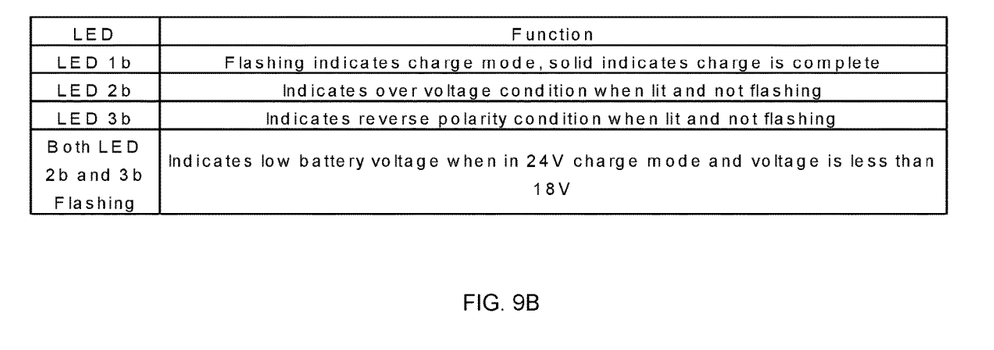

FIG. 9A illustrates example functions of multiple-function LEDs that may be used on the service pack of FIG. 1 to provide information to an operator with a reduced number of LEDs. FIG. 9B illustrates example functions of multiple-function LEDs that may be used on the service pack of FIG. 1 to provide information to an operator with a reduced number of LEDs. In the examples of FIGS. 9A and 9B, the multiple-function LEDs enable additional information to be provided to operators of the power system 100.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed.

What is claimed is:

1. A power system, comprising:
an engine;
a generator to provide electrical power based on mechanical power received from the engine, the electrical power comprising welding-type power and non-welding power; and
a controller to control the generator or the engine to increase or decrease a voltage of the non-welding power based on an open circuit voltage measurement of the welding-type power at a welding-type output.

2. The power system as defined in claim 1, wherein the controller is to decrease the voltage of the non-welding power when the open circuit voltage measurement of the welding-type power exceeds a first threshold.

3. The power system as defined in claim 2, further comprising an overvoltage protection circuit to disable at least one of the welding-type power or the non-welding power when the open circuit voltage measurement exceeds a second threshold, the second threshold being a higher voltage than the first threshold.

4. The power system as defined in claim 3, wherein the overvoltage protection circuit comprises redundant circuits configured to selectively disconnect the welding-type output or a non-welding type output from the generator.

5. The power system as defined in claim 1, further comprising a voltage sensor to measure the open circuit voltage for the welding-type output and to provide a signal representative of the open circuit voltage to the controller as the voltage measurement of the welding-type power.

6. The power system as defined in claim 1, wherein the controller is to control the generator to increase the voltage of the non-welding power by increasing a field current of the generator.

7. The power system as defined in claim 1, wherein the controller is to control the generator to decrease the voltage of the non-welding power by decreasing a field current of the generator.

8. The power system as defined in claim 1, wherein the controller is to control the generator or the engine to increase or decrease the voltage of the non-welding power when a welding-type output is not providing the welding-type power.

9. The power system as defined in claim 1, further comprising an overvoltage protection circuit to disable at least one of the welding-type power or the non-welding power when the voltage measurement exceeds a threshold.

10. The power system as defined in claim 1, wherein the welding-type power and the non-welding power are configured to receive the electrical power via a same field winding in the generator.

11. The power system as defined in claim 1, wherein the controller is electrically isolated from the non-welding power.

12. A method, comprising:
providing non-welding electrical output from an engine-powered electrical generator to an output device;
measuring an open circuit voltage of a welding-type output provided by the electrical generator; and
controlling the generator or the engine, using a control circuit, to increase or decrease a voltage of the non-welding output based on the open circuit voltage measurement of the welding-type output.

13. The method as defined in claim 12, wherein the controlling of the generator or the engine comprises decreasing the voltage of the non-welding output when the open circuit voltage measurement of the welding-type output exceeds a first threshold.

14. The method as defined in claim 13, further comprising disabling, using one or more circuits, at least one of the welding-type output or the non-welding output when the open circuit voltage measurement exceeds a second threshold, the second threshold being a higher voltage than the first threshold.

15. The method as defined in claim 14, wherein the disabling of the at least one of the welding-type output or the non-welding output comprises selectively disconnecting, via the one or more circuits, the welding-type output or the non-welding type output from the generator.

16. The method as defined in claim 12, further comprising controlling the generator to increase the voltage of the non-welding output by increasing a field current of the generator.

17. The method as defined in claim 12, further comprising controlling the generator to decrease the voltage of the non-welding output by decreasing a field current of the generator.

18. The method as defined in claim 12, further comprising disabling at least one of the welding-type output or the non-welding output when the open circuit voltage measurement exceeds a threshold.

19. The method as defined in claim 12, wherein the providing of the non-welding output comprises providing electrical power for the non-welding output from a same field winding in the generator as the welding-type output.

20. A power system, comprising:
a generator to provide electrical power based on mechanical power received from an engine, the electrical power comprising welding-type power and non-welding power; and
a controller to control the generator or the engine to increase or decrease a voltage of the non-welding power based on a voltage measurement of the welding-type power at a welding-type output; and
an overvoltage protection circuit comprising redundant circuits configured to selectively disconnect the welding-type power from the generator when the voltage measurement exceeds a threshold voltage.

* * * * *